UNITED STATES PATENT OFFICE.

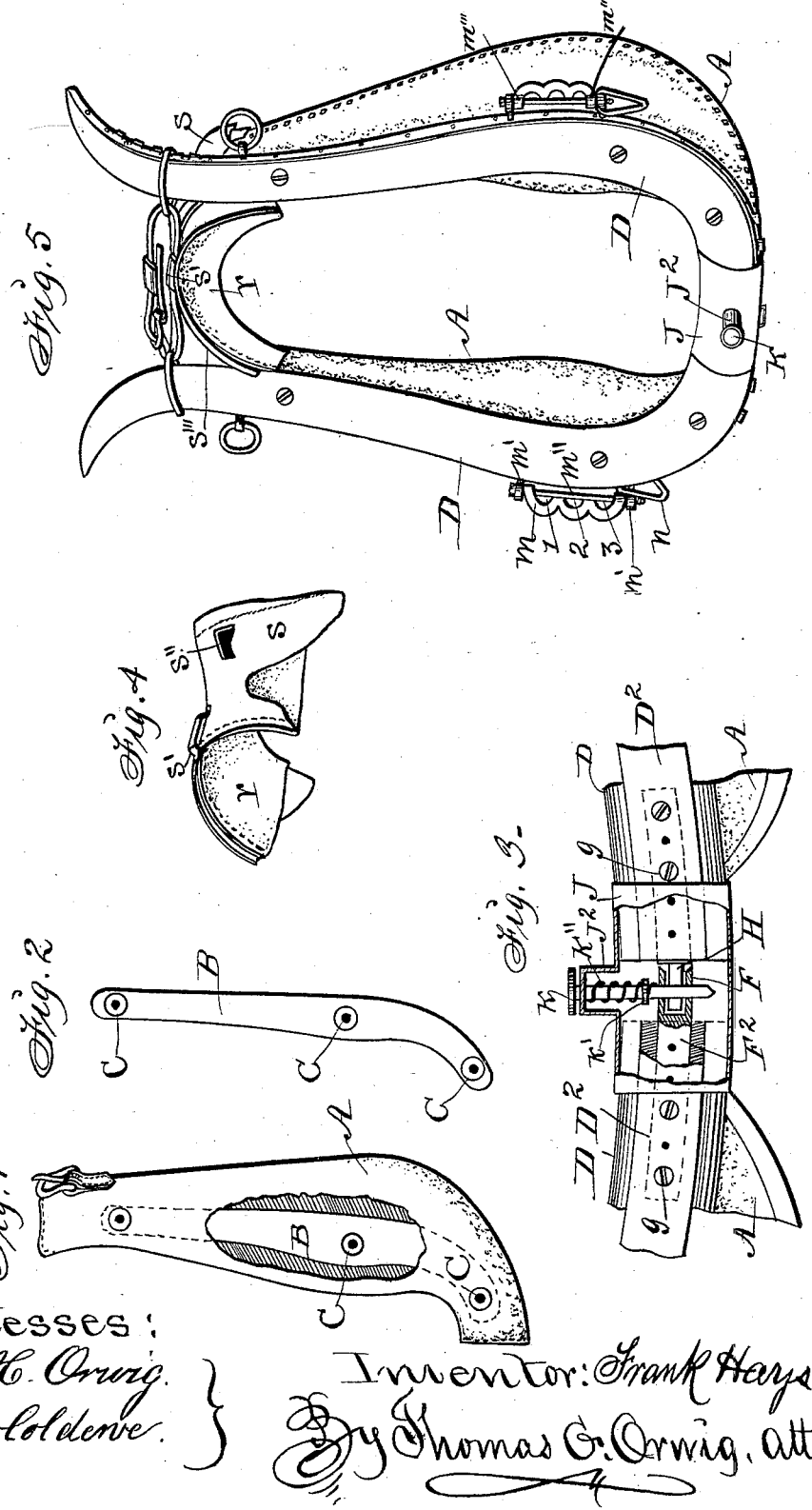

FRANK HAYS, OF OTTUMWA, IOWA.

HORSE-COLLAR.

SPECIFICATION forming part of Letters Patent No. 358,855, dated March 8, 1887.

Application filed March 9, 1886. Serial No. 194,655. (No model.)

*To all whom it may concern:*

Be it known that I, FRANK HAYS, a citizen of the United States of America, and a resident of Ottumwa, in the county of Wapello and State of Iowa, have invented a Horse-Collar and Hames Combined, of which the following is a specification.

My object is to dispense with the rim of a collar, to thereby save some of the material, labor, and expense incident to making collars and hames independently, and to make the hames and collar jointly adjustable to fit horses of different sizes.

My invention consists in the construction and combination of pads, pad-stays, and screw-seats, hames having extensible coupling devices at their lower ends, a tubular metal collar-section and locking device, tug-fasteners, and a housing-pad, as hereinafter set forth, pointed out in my claims, and illustrated in the accompanying drawings, in which—

Figure 1 is a perspective view of one of my pads, having part of the leather removed to show the stay and screw-seat. Fig. 2 represents one of the metal stays having screw-seats. Fig. 3 is a sectional view of the ends of the hames and their connecting devices. Fig. 4 is a perspective view of the housing and pad combined. Fig. 5 is a perspective view of the complete collar and hames combined.

A represents the after wale or pad of a collar, made of leather or other flexible material, by stitching or riveting the edges of the material together in a common way, and then filling it with cut straw or other suitable stuffing.

B is a flat metal bar, curved at its lower end to correspond with the shape of the pad, and provided with integral screw-seats C, placed in the pad to stay and stiffen it and to serve as a means of fastening the hames to the pad, in lieu of the fore wale or rim heretofore formed integral with the after wale or pad.

D represents hames of common form, preferably made of wood, detachably and adjustably connected at their top ends with a strap and buckle and rings in a common way. They are re-enforced with metal straps $D^2$, and provided with adjustable coupling devices at their lower ends.

F is a socket or tubular open-ended head, that has a perforated shank, $F^2$, fitted in a recess formed in the hame D, under the end of the metal strap $D^2$, in such a manner that the end of the shank can be fastened to the hame by means of a set-screw, $g$, passed through a perforation in the shank $F^2$, as clearly shown in Fig. 3.

H is a mating coupling device adjustably connected with the end of the mating hame in such manner that one or both sections of the coupling can be moved in or out relative to the ends of the hames and complete collar as required to spread or contract the lower end of the collar, and thereby enlarge or diminish the size to fit different horses.

J is a tubular open-ended metal section slipped over the end of one of the hames, and fastened thereto by means of a screw, or in any suitable way.

$J^2$ is a spring-seat and pin-bearing formed on or fixed to the section, to project outward.

K is a pin passed through a perforation in the bearer, to extend through a coinciding perforation in the socket F, and the end of the mating coupling-bar H to lock the two parts and the lower ends of the complete collar together when placed over a horse's neck.

$k'$ is a collar on the pin, and $k''$ a spring placed on the pin in such a manner that it will, in its normal condition, hold the pin down as required to connect the coupling devices F and H.

$m$ is a tug-fastening device hinged to the hame by means of screw-eyes $m'$, fixed to the hame, and a screw-bolt, $m''$, passed down through the eyes $m'$ and the eyes $m'''$ at the top and bottom of the device $m$.

1 2 3 are notches in the inside edge of the device $m$, adapted to receive a clip on the end of a hame-tug. By withdrawing the bolt $m'$ the clip can be placed in any one of the series of notches and secured therein by replacing the bolt. A simple tug-fastening device is thus provided, by means of which the tug can be readily raised and lowered relative to the collar.

$n$ represents a ring placed over the lower screw-eye, $m'$, and secured by means of the same bolt that connects the fastening device $m$ with the screw-eyes.

$r$ is a neck-pad of common form, made of leather and adapted to fit between the top portions of the complete collar as required to rest upon the horse's withers.

S is a leather housing-pad stitched fast to the side edges of the neck-pad in such manner that the top ends of the collar will extend up between the two pads and the hames over the outside of the housing-pad.

$s'$ is a loop fixed on the top and center of the pad S, to allow the strap that connects the top ends of the hames to be passed through and to support the housing-pad at an elevation as required in lengthening and shortening the collar to raise or lower it on a horse.

$s''$ are slots in the housing.

$s'''$ is a strap fastened to the top of one of the pads A and passed through the slots $s''$, and adjustably connected with the top of the other pad by means of a buckle in a common way.

I am aware that metal bars have been inserted in collar-pads and metal rims having sockets at their ends fixed to the pads; but my manner of forming and combining a detachable and adjustable tubular collar-section with the combined ends of the pads and rims of a collar is novel and advantageous.

I am also aware that a notched tug-fastening device and a spring have been combined with a hame and collar in such a manner that the tug could be raised and lowered; but my manner of making a detachable device and fastening a hame-tug in one of its notches by means of a detachable bolt is new and useful for adjusting and retaining the hame-tug at different points of elevation relative to the shoulders of a horse.

I claim as my invention—

1. The combination of the adjustable coupling devices F, F$^2$, and H with the lower ends of the hames D and pads A, jointly, and a tubular collar-section carrying a locking device to fasten the interlocking ends of the coupling devices together, for the purposes specified.

2. The tubular collar-section J, having a pin-bearing, J$^2$, the pins $k$ $k'$, the spring $k''$, the adjustable coupling devices F F$^2$, and the hames D, having fixed pads A, constructed, arranged, and combined to operate in the manner set forth, for the purposes stated.

3. The hame-tug-fastening device $m$, having notches in its inner edge and eyes at its top and bottom, in combination with a hame having fixed eyes $m'$ and a bolt, $m''$, for the purposes stated.

4. The combined horse-collar pad and housing, composed of a pad, $r$, and a housing, $s$, having a loop, $s'$, and slots $s''$, in combination with the collar-pads A and hames D, substantially as shown and described, for the purposes stated.

5. The combination of the pads A B C, the hames D D$^2$, the coupling devices F and H, and the collar-section J, substantially as shown and described, for the purposes stated.

FRANK HAYS.

Witnesses:
R. H. ORWIG,
THOMAS G. ORWIG.